United States Patent [19]
Deschamps et al.

[11] 3,956,440
[45] May 11, 1976

[54] PRODUCTION OF FINE GRAINED FERRITE BODIES

[75] Inventors: André Deschamps; Georges Faye, both of Paris Cedex, France

[73] Assignee: Societe Lignes Telegraphiques et Telephoniques, Paris Cedex, France

[22] Filed: Jan. 23, 1973

[21] Appl. No.: 326,022

[30] Foreign Application Priority Data
Feb. 15, 1972 France .............................. 72.04921

[52] U.S. Cl. .............................. 264/56; 252/62.56; 252/62.57; 264/61; 264/65; 264/66; 264/DIG. 58
[51] Int. Cl. ...................... C01g 49/08; C04b 35/40
[58] Field of Search ...................... 252/62.56, 62.57; 423/263; 264/65, 61, 56

[56] References Cited
UNITED STATES PATENTS

| | | | |
|---|---|---|---|
| 3,039,963 | 6/1962 | MacCallum | 423/263 |
| 3,751,366 | 8/1973 | Bomar et al. | 223/335 |

OTHER PUBLICATIONS
Harvey et al.; RCA Review, Sept. 1950, pp. 344–349.

Primary Examiner—Donald J. Arnold
Assistant Examiner—John Parrish
Attorney, Agent, or Firm—Kemon, Palmer & Estabrook

[57] ABSTRACT

The small dimension (inferior to one micrometer) of the grains of oxides obtained by chemical precipitation is retained during the processing of the ferrimagnetic part through precise stoichiometry, cold isostatic pressing and sintering under vacuum at a temperature below 1400°C and for a duration shorter than 4 hours.

5 Claims, 2 Drawing Figures

PRODUCTION OF FINE GRAINED FERRITE BODIES

BACKGROUND OF THE INVENTION

The present invention concerns an improved process for the production of magnetic materials and more particularly of materials of the garnet type, the grain size of which is such that no grain has a diameter larger than 1 micron. It is well known that the use of magnetic materials at ever increasing frequencies has led to attempts to obtain polycrystalline materials consisting of ever smaller grains, so as to approach as closely as possible the theoretical density of the bulk material, after sintering. It is known that the line width is smaller in proportion as the product is denser. In addition, the high power behaviour of ferrite devices is better in proportion as the grain size of the material employed is smaller. Grains of a dimension equal to or smaller than 1 micron are currently obtained by milling coarser crystallites. This operation, which may take several tens of hours, is a considerable disadvantage when the production of this type of material is concerned.

The present invention consists essentially in a process which involves no mechanical milling step and the various manufacturing steps of which are such as to prevent any growth of the crystallites, which can be obtained with very small dimensions by coprecipitation of metal salts under appropriate conditions.

PRIOR ART

The preparation of oxides and/or hydroxides of the metals constituting the ferrimagnetic materials by chemical coprecipitation of salts in aqueous medium, for the purpose of obtaining grains having a dimension at most equal to one micron, is well known per se. Such a process forms inter alia the subject of French Patent 2,034,119, filed on the Feb. 7, 1969, by Ugine - Kuhlmann.

U.S. Pat. No. 3,039,963 dated Feb. 25, 1960 describes the preparation of yttrium - iron garnet by coprecipitation in a non-aqueous medium of yttrium nitrate and iron nitrate by means of sodium hydroxide, the non-aqueous medium in which the precipitation takes place being a mixture of alcohols and ketones. The hydroxides are thereafter washed and then dried and baked for about 4 hours at 1000° C or longer at lower temperature. The sintering operation itself is not described in the specification. It is clearly specified in this patent that the coprecipitation of iron and yttrium nitrates by means of ammonia in the aqueous phase does not give garnet crystallites when the baking is performed at 400° C, but merely makes it possible to obtain garnet grains by heating at 1000° C for thirteen hours.

SUMMARY OF THE DISCLOSURE

The present invention relates essentially to a process for production of ferrimagnetic materials obtained by coprecipitation from a stoichiometric mixture of metallic salts corresponding to the material composition by means of a base comprising an isostatic pressing step of the dried oxides followed by a short vacuum heat treatment of complete duration under twelve hours including heat-up and cooling times. Preferably, the coprecipitation operations are carried out in alcoholic medium and the salts employed are chlorides. The nitrates may also be employed. The nature of the base depends on the material to be obtained. For instance, when Ni - Zn ferrites are concerned soda should be used. When yttrium - iron garnets are concerned ammonia is preferred. Isostatic pressing is performed at room temperature under a pressure between $10^8$ and $10^9$ Pascal. The pellet thus formed is out-gassed in a vacuum oven down to a pressure of $10^{-5}$ mm.Hg and then subjected to a thermal treatment in vacuo, characterised by a positive thermal gradient between 40° and 60° C per minute, followed by a constant temperature heating of a duration of less than three hours, which is succeeded by cooling under a negative thermal gradient between 300° and 600° C per hour.

One of the features of the process according to the invention lies in the association of an isostatic pressing step at room temperature with a very rough heat treatment in vacuo at a relatively low temperature and for a relatively short period of time. By the use of a treatment in vacuo, it is possible considerably to increase the temperature gradients in the heating and in the cooling periods, whereby the thermal treatment is shortened. The use of a vacuum oven also makes it possible to reduce the sintering temperature by about 300° C (1200° C instead of 1500° C in the case of Al-Fe-Y-Gd garnets), whereby the growth of the crystallites is lessened. Only the isostatic pressing develops by mechanical stresses which are sufficiently low to avoid fissures, cracks, etc . . ., formation during vacuum heating.

It has been found that the baked mixture of hydroxides already shows magnetic properties in contrast to what is stated in the last-mentioned patent, if the coprecipitation is carried out under conditions which are such as to provide the stoichiometry. The invention also concerns improvements in the known process of coprecipitation of salts in solution by means of a base.

One of the main advantages of the invention lies in the considerable reduction in the period of time necessary for the manufacture of a production run. This saving in time is due mainly to the reduction of the duration of the heat treatment. For example, in the case of a Fe-Y-Gd-Al garnet, the standard heat treatment lasts for about eight days, the build up of the level temperature at 1530° C corresponding to the sintering in air takes about three days, the heating lasts 2 days and the cooling of the oven lasts about 3 days. By application of the process of the present invention, using vacuum sintering in one production run, the temperature is brought to 1000° C in about a quarter of an hour, it is followed by a step of 1 hour and a second rise to a temperature of 1200° C, which is maintained for 2 hours. The cooling of the oven lasts about three hours. The heat treatment may therefore be carried out in the course of the normal eight hour work day of an operator. The preparation of the powder by coprecipitation of salts suppresses the two grinding operations separated by a four-days presintering, which are usually involved in the production of garnets. Each of these operations lasts about 48 hours and there is always a danger that they might result in an introduction of an excess of iron into the powder ruining the stoichiometry.

DETAILED DESCRIPTION OF THE INVENTION

Figure 1:
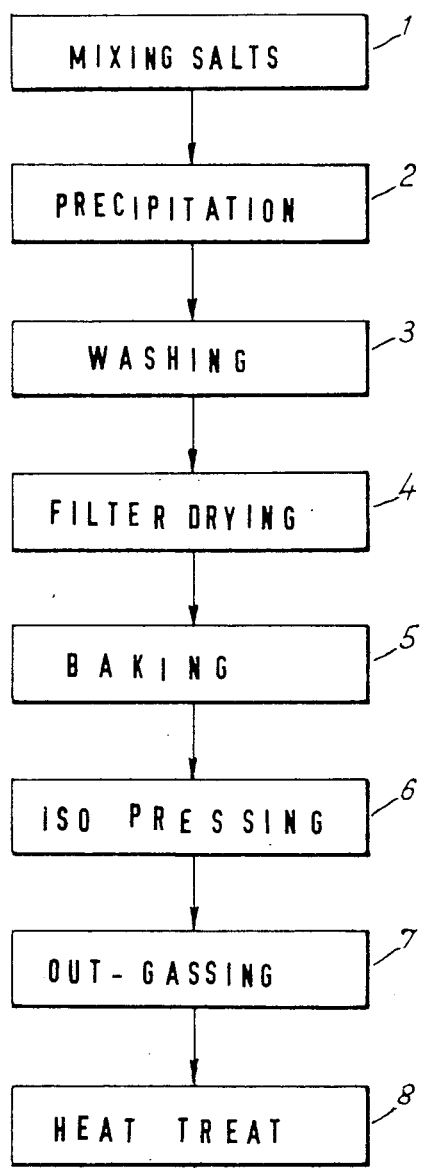
Figure 2:
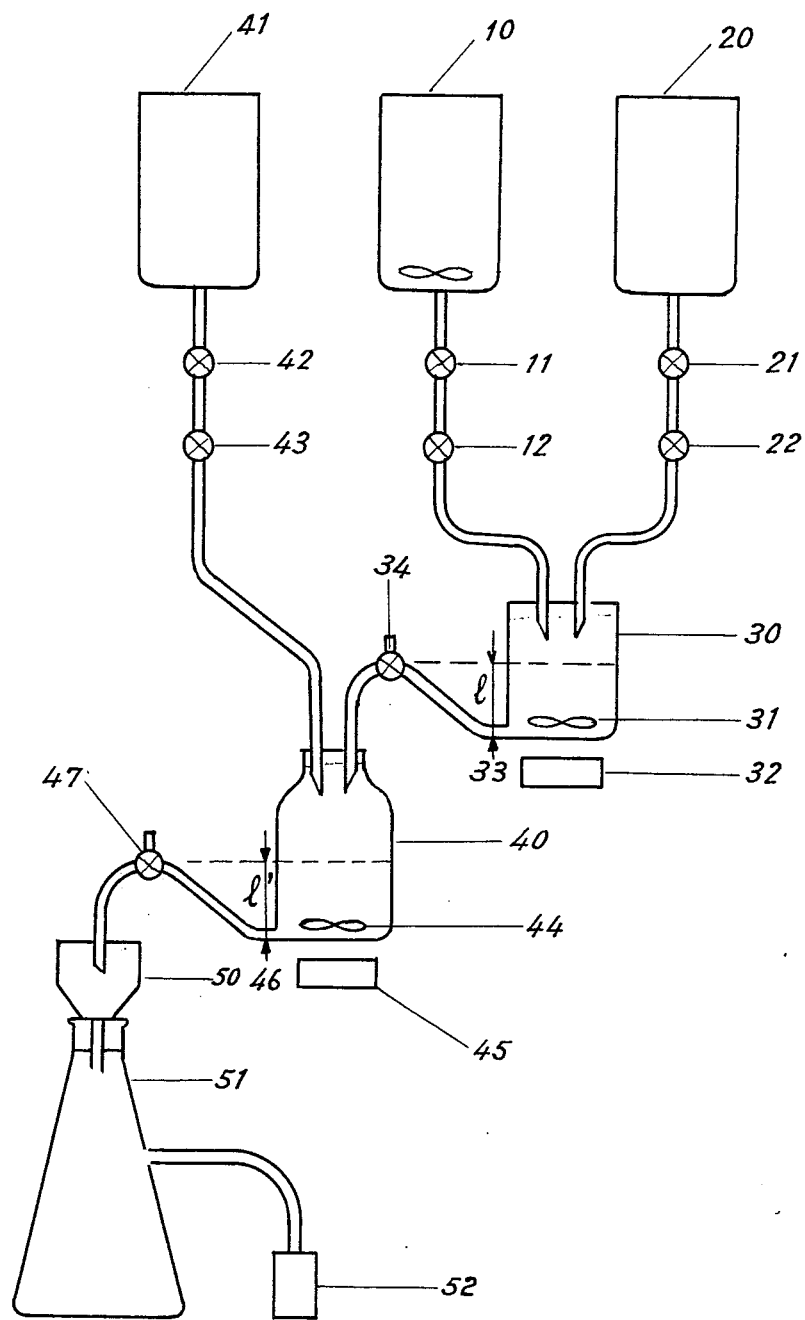

The invention will be readily understood from the following description and by reference to the accompanying FIGURES, which are given by way of non-limiting example, and in which:

FIG. 1 illustrates the successive stages in the performance of the process,

FIG. 2 diagrammatically illustrates the apparatus employed for the coprecipitation and the washing of the oxides obtained, The steps in FIG. 1 will be described in the case of production of a garnet pig. The successive operations involved in carrying out the process of the invention consist in preparing a stoichiometric mixture of chlorides of iron, yttrium and optionally rare earth metals (step 1) in suspension in ethyl alcohol. Through this mixture of chlorides is bubbled a current of ammonia emulsified in ethyl alcohol, which coprecipitates the hydroxides (step 2). In accordance with one of the features of the invention, the mixture is continuously agitated during the coprecipitation. Immediately on being formed, the hydroxides containing ammonium chloride are continuously drained to a washing station (step 3) by an emulsion of ammonia in ethyl alcohol (30 % ammonia concentration). The efficacy of the washing is increased by constantly agitating the precipitate. The precipitate is thereafter filtered and dried to eliminate the alcohol (step 4), and the powder obtained is baked at 700°C for 2 hours (step 5) in an oven in air. The ammonium chloride is thus eliminated. A fine-grained powder is thus obtained: the fraction of the grains having a diameter of more than one micron is negligible. The powder, which is green and magnetic, is then pressed to form a coherent ferrite block in an isostatic press (step 6) under a pressure of 5 t/cm$^2$ (5.10$^8$ Pascal), whereafter the ferrite is introduced into a vacuum oven, in a metallic crucible, for example of tantalum, and embedded in alumina powder, which is intended to ensure an homogeneous temperature distribution in the block. The oven is out-gassed down to a pressure of 10$^{-5}$ mm.Hg (step 7) at room temperature. The use of a stoichiometric mixture of chlorides at the outset is important, because it avoids any excess of chloride, except the ammonium chloride, in the mixture of oxides, whereby the quantity of gas which escapes during out-gassing is considerably reduced. The out-gassing lasts less than 1 hour.

Only by the use of isostatic pressing, which reduces the mechanical stresses in the pressed block, is it made possible to obtain a solid out-gassed block without the formation of any cracks or fissures.

Then the oven heats. The temperature gradient of the sintering oven must be designed so that the heating-up (1,200°–1400°C) does not take longer than thirty minutes. The quicker the oven heats, the better. Production has been carried on with a 10 minutes heat up time. But of course the lower value of heat up time depends on the oven size. A first level heating at 1000°C, lasting 1 hour, is followed by a second level stage at the maximum temperature. The total duration of the level stages remains less than 3 hours.

FIG. 2 diagrammatically illustrates an apparatus for carrying out operations 1, 2, 3 and 4 mentioned in the foregoing. A first reservoir 10 contains the stoichiometric mixture of chlorides in alcoholic emulsion. This reservoir is provided with a stop valve 11 and a dropping valve 12. A second reservoir 20 contains the ammonia emulsion in alcohol, its outlet pipe also comprising a stop valve 21 and a dropping valve 22. The liquids coming from the reservoirs 10 and 20 fall together drop-by-drop into a receptacle 30 containing a magnetic stirrer 31, the external motor of which is denoted by 32. This receptacle is previously filled with the ammoniacal emulsion to a level $l$. The oxides precipitate on the bottom of the receptacle 30, of which the base communicates through an horizontal tube 33 with a siphon 34, the highest point of which corresponds to the level $l$. The siphon 34 is therefore filled with ammonia and the precipitated solids are driven off by the liquid, which enter the receptacle 30 and fall by way of the siphon 34 into a washing receptacle 40. This receptacle also receives alcohol from a store 41 provided with a stop valve 42 and a dropping valve 43. The receptacle 40 contains a magnetic stirrer 44 driven by the external motor 45. Like the receptacle 30, it has at its lower end a tube 46 communicating with a siphon 47. At the start, the receptacle 40 is filled with alcohol to the level $l'$ corresponding to the highest point of the siphon 47. Under the pressure exerted by the hydroxides coming from the receptacle 30 and the alcohol coming from the receptacle 41, the washed hydroxides fall by way of the siphon 47 into the filter 50. The filter 50 communicates with the receptacle 51, into which there flows the alcohol carried by the hydroxides. Preferably, the receptacle 51 is in communication with a vacuum pump, denoted by 52, which sucks in the liquid arriving at the filter 50.

An iron, yttrium, gadolinium, and aluminium garnet, manufactured according to the invention had the following electrical characteristics, measured at 9 GHz: line width 200 oersteds, loss tan $\delta = 10^{-4}$ and saturation magnetisation 4 $\pi$Ms = 1060. Such a material is particularly useful for the construction of microwave circuits operating at a high power level in microelectronics because, the mean dimension of the grains is less than 1 $\mu$m. Micrographs of the product may have dark spots, which result from a lack of material on the surface owing to gaps due to polishing. Polishing is carried out with alumina in accordance with a known technique. The grains of alumina are of the same order of magnitude as those of the garnet, which exhibit substantially no grain junctions. Thus, despite good cohesion of the material obtained, polishing carries off garnet grains.

A garnet corresponding to the formula:

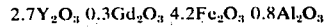

2.7Y$_2$O$_3$ 0.3Gd$_2$O$_3$ 4.2Fe$_2$O$_3$ 0.8Al$_2$O$_3$ manufactured according to the process shown in FIG. 1 with a 3 hour vacuum heating at 1275°C after a heat-up period of 10 minutes and a cooling temperature gradient higher than 300°C per hour has been produced with a density of 5.1 gm./cc. a line width of 60 oersteds, a saturation magnetisation 4 $\pi$Ms = 455 gauss and practically all the crystallites under one micrometer. By way of comparison, the same garnet made under the standard long process (12 hour heating under oxygen at 1535°C ect ...) slow heat up and cooling has shown grain size much larger, a density of 5.13 gm./cc 4 $\pi$Ms = 495 gauss and a line width of almost the same value.

As shown by the above examples, the data of the material produced according to the invention are almost equivalent with respect to magnetic characteristics. The grain size reduction is the very important characteristic of these materials. As is well known, this feature is very important as far as high level microwave devices are concerned. The main application of the materials is therefore microwave circuitry manufacture.

What we claim:

1. A process for the production of shaped bodies of fine grained ferrimagnetic material which comprises in combination the steps:
- preparing a stoichiometeric suspension of salts selected from the group consisting of nitrates and chlorides corresponding to the ferrimagnetic material chemical formulation in alcohol,
- coprecipitating said salts in alcoholic suspension as metal hydroxides by addition thereto of a base,
- recovering and drying the resulting coprecipitate,
- baking the dried coprecipitate in air at about 700°C for about 2 hours,
- isostatically pressing the baked coprecipitate into a solid desired shaped body under a pressure between $10^8$ and $10^9$ Pascal,
- sintering said shaped body under a vacuum of about $10^{-5}$ mm/Hg for about 3 to less than 4 hours at a temperature about 1200°C to 1400°C.

2. The process of claim 1 wherein said sintering temperature is attained in two levels.

3. The process of claim 2 wherein the first temperature level is about 1000°C which is attained in about 10 minutes and lasts for about 1 hour and the second temperature level is about 1200°C which is followed by cooling at a cooling gradient between about 300°C to 600°C per hour.

4. The process of claim 1 in which said alcoholic suspension is continuously stirred during precipitation and subsequent washing.

5. The process of claim 1 wherein said shaped body after said sintering step is cooled at a cooling gradient between about 300°C to 600°C per hour.

* * * * *